Oct. 31, 1944.  L. C. HUCK  2,361,770
MANUFACTURE OF RIVET ELEMENT
Filed May 28, 1943  3 Sheets-Sheet 1
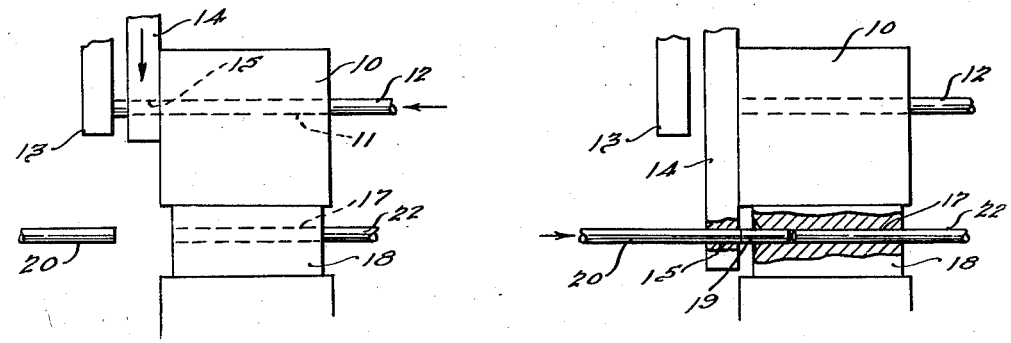
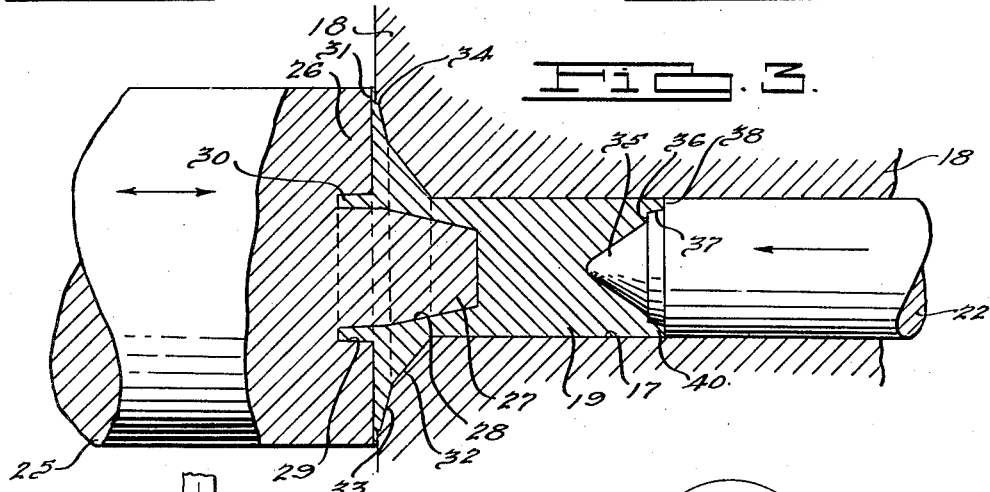
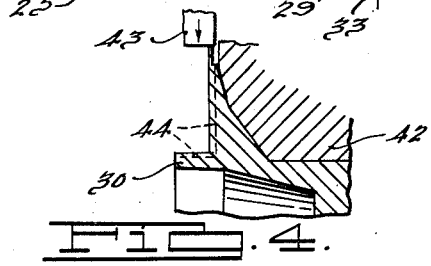
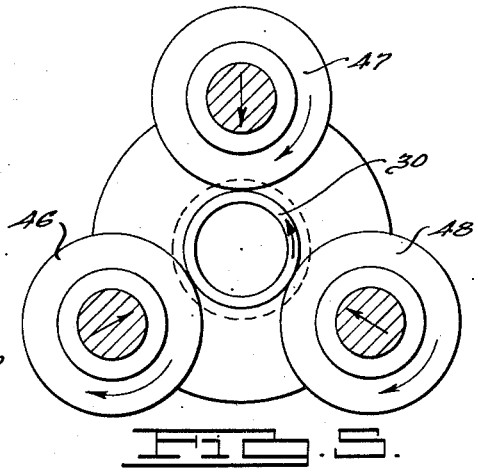
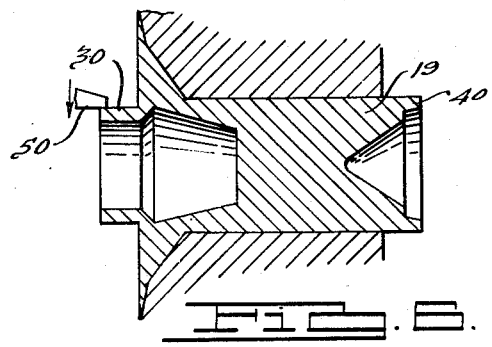
INVENTOR
Louis C. Huck.
BY Harness, Dickey & Pierce
ATTORNEYS.

Oct. 31, 1944. L. C. HUCK 2,361,770
MANUFACTURE OF RIVET ELEMENT
Filed May 28, 1943 3 Sheets-Sheet 2
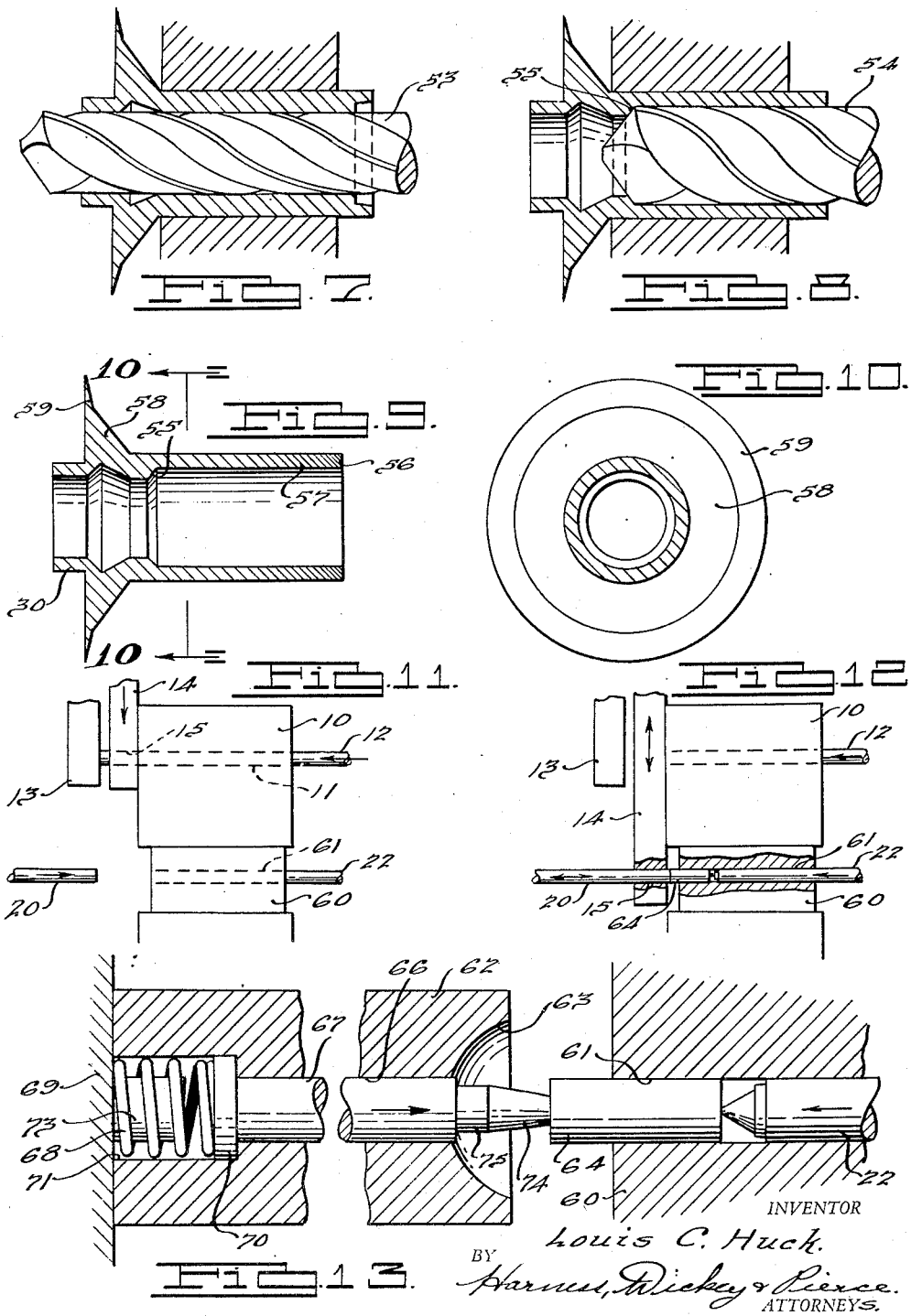
INVENTOR
Louis C. Huck.
BY
Harness, Dickey & Pierce.
ATTORNEYS.

Oct. 31, 1944.  L. C. HUCK  2,361,770
MANUFACTURE OF RIVET ELEMENT
Filed May 28, 1943  3 Sheets-Sheet 3
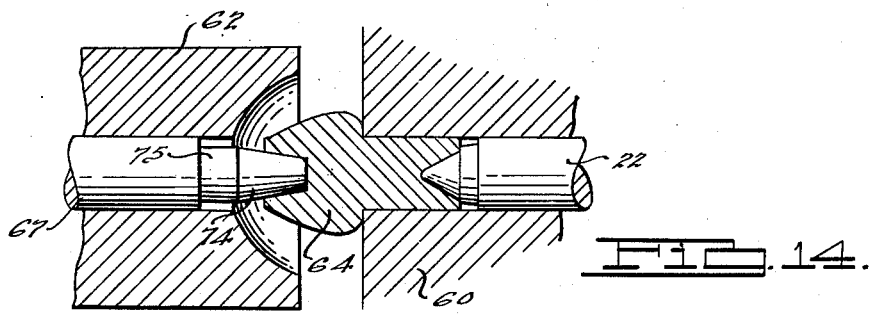
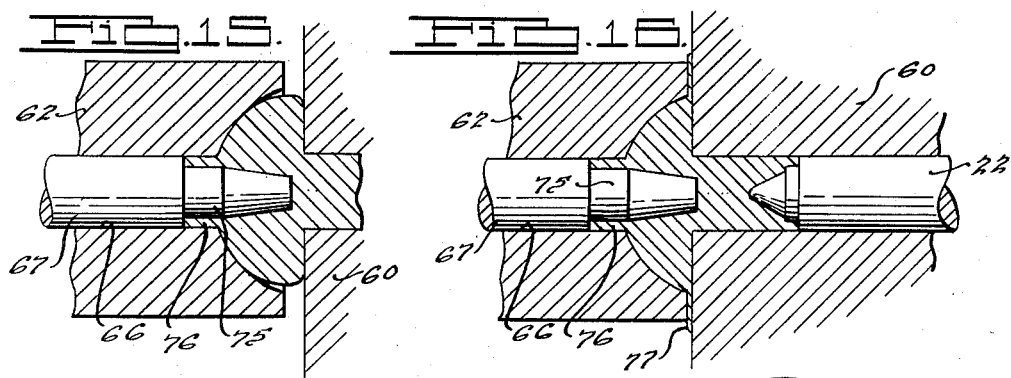
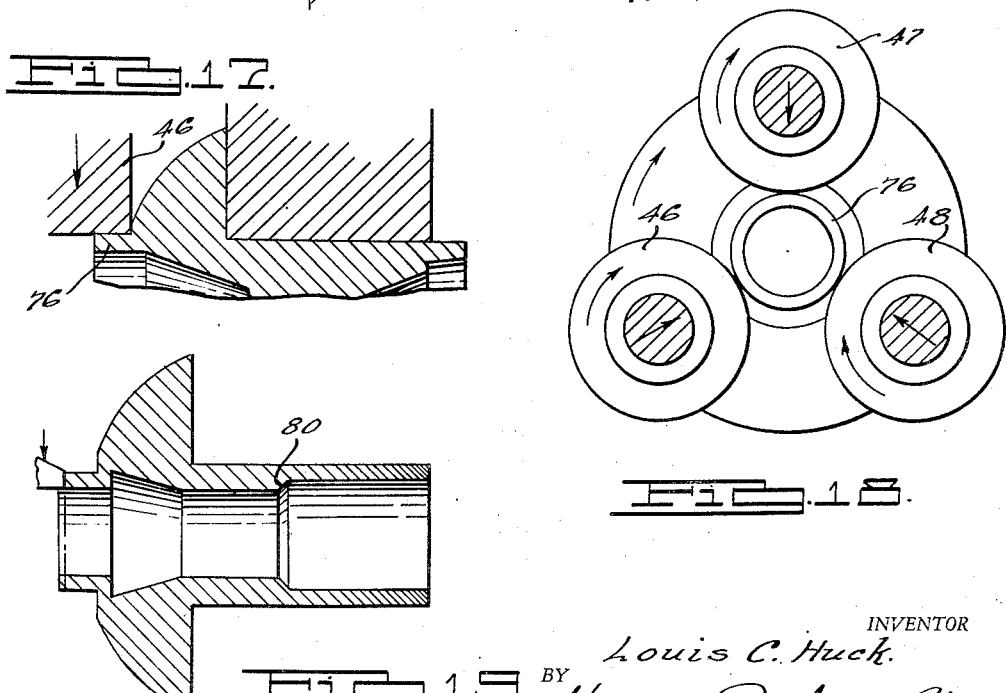
INVENTOR
Louis C. Huck.
BY
Harness, Dickey & Pierce
ATTORNEYS.

Patented Oct. 31, 1944

2,361,770

UNITED STATES PATENT OFFICE 2,361,770

MANUFACTURE OF RIVET ELEMENTS

Louis C. Huck, Grosse Pointe Shores, Mich., assignor, by mesne assignments, to Huxon Holding Corporation, Detroit, Mich., a corporation of Michigan Application May 28, 1943, Serial No. 488,842

17 Claims. (Cl. 10—27)

This invention relates generally to rivets and it has particular relation to a method of and apparatus for manufacturing rivets.

While the invention herein embodied may have wider application, it is particularly concerned with the manufacture of the tubular part of a rivet such as embodied in my copending application for patent, Serial No. 454,211, filed August 10, 1942, and entitled "Rivet and method of riveting." In the tubular parts or elements shown in that application, the head has an integral collar or projection which during the rivet setting operation is axially sheared from the head and moved into a locking recess formed jointly by the rivet pin and interior surface of the tubular element. This locking recess, in part at least, is larger in diameter than the inner diameter of the collar.

Also, the tubular element has a cold worked or strain-hardened wall at its opposite end for controlling outward expansion of the tubular element at that side of the structure being riveted opposite the previously mentioned head. The strainhardened condition, as explained in the aforementioned copending application for patent, includes a more uniformly and strongly resistant end section which has greater resistance to outward expansion so that the wall of the tubular element between this section and the structure being riveted will have less resistance to expansion. Accordingly, outward expansion or bulbing of the wall will occur more readily between the reinforced end section and the structure being riveted so as to assure formation of a bulbed head. Additionally, the wall between said end section and the structure being riveted and adjacent such reinforced section, has a progressively varying strainhardened portion so as to control the bulbing action.

The tubular element includes other structural characteristics which cooperate with the pin or male rivet element during setting of the rivet in order to obtain desired results in the riveted structure. Setting of the rivet is accomplished readily after the parts are manufactured and assembled as will be readily understood from the copending application for patent.

One object of the present invention is to provide an efficient and economical method of manufacturing a tubular rivet element of the type above briefly set forth and of the type disclosed in the copending application for patent identified.

Another object of the invention is to provide apparatus for manufacturing a tubular rivet element having structural characteristics such as mentioned, to the end that the elements may be manufactured rapidly, accurately, and economically.

Another object of the invention is to provide an efficient and economical method of manufacturing a tubular rivet element having an integral collar such as mentioned, to the end that the collar and groove within the head of the tubular element may be related diametrically through rapid, efficient, and accurate machine operations.

Another object of the invention is to provide an efficient method of forming a strainhardened or cold worked tubular element which assures substantially uniform results while permitting rapid production.

And in general it is an object of the invention to provide a method of and apparatus for manufacturing a tubular rivet element on the order of that mentioned which will enable high speed production with precision results, to the end that a low cost, accurate, and uniformly made product may be obtained.

Other objects of the invention will become apparent from the following specification, from the drawings relating thereto, and from the claims hereinafter set forth.

For a better understanding of the invention, reference may be had to the accompanying drawings wherein:

Figure 1 is a generally diagrammatic view illustrating apparatus for cutting blanks from wire stock and performing certain metal upsetting operations;

Figure 2 shows one of the rivet blanks placed in position for effecting the heading and other upsetting operations;

Figure 3 is a detail view on a larger scale, illustrating the die and punches at opposite ends of the blank for forming the head and collar at one end of the blank and for effecting the cold working or strainhardening at the other end of the blank;

Figure 4 is a detail view showing other apparatus for trimming the outer face of the head on the element so as to obtain the desired diametrical and axial dimensions;

Figure 5 illustrates apparatus for radially reducing the integral collar so as to position it nearer to the axis of the element;

Figure 6 illustrates apparatus for trimming or cutting the collar to the desired axial length;

Figure 7 illustrates a first drilling operation;

Figure 8 illustrates a second drilling operation;

Figure 9 illustrates the finished, tubular rivet element;

Figure 10 is a cross-sectional view taken substantially along the line 10—10 of Figure 9;

Figures 11 and 12 are views on the order of Figures 1 and 2 illustrating apparatus for manufacturing a rivet element having a brazier head instead of the flush-type rivet head shown in the previous figures;

Figure 13 is a cross-sectional view showing apparatus for forming the brazier head in conjunction with the punch for forming the strainhardened or cold worked end;

Figures 14, 15, and 16 show different steps in the forming of the head on the rivet element;

Figure 17 is a cross-sectional view showing the manner in which the rollers are employed for reducing the diametrical dimensions of the collar;

Figure 18 is an end view showing the rollers employed in reducing the collar;

Figure 19 is a cross-sectional view of the finished tubular member after drilling operations on the order of those shown in Figures 7 and 8.

Referring to Figures 1 and 2, the apparatus shown includes a frame or support 10 having an opening 11 therein through which metal wire stock 12 advances. This stock is moved against a stop 13 spaced from one side of the frame and after the stock has moved into engagement with the stop, the length of wire between the frame and stop is cut off. The cutting mechanism includes a knife 14 having an opening 15 through which the wire passes, and when the knife is moved transversely to the wire, the blank is cut off and furthermore is carried with the knife. As shown best by Figure 2, the knife 14 moves to a position where its opening 15 is aligned with an opening 17 provided in a die 18 and upon movement of the wire blank indicated at 19 to a position where it is aligned with the opening 17 in the die, a punch or pin 20 advances and moves the blank out of the knife opening and into the end of the die opening.

The blank is advanced into the opening 17 a distance governed by a knock-out punch 22 and this punch is so positioned that a substantial length of the wire blank will be left projecting from the end of the die opening so as to provide metal for forming a head on the blank. Movement of the pin 20 not only advances the blank into the die opening, but it also forces it against the punch 22 sufficiently that some upsetting of the blank occurs so as to bind or hold the latter in the opening. After such insertion of the blank into the opening, the element 20 is withdrawn, the knife 14 is retracted, and a heading punch for forming the head on the element moves against the projecting end of the blank.

Referring now to Figure 3, the heading punch is indicated at 25 and includes a rim or outer portion 26 adapted to form a corresponding flat face portion on the head of the rivet. A central and projecting part 27 is adapted to press into the end of the blank and form an inclined or conical opening 28 which extends partially through the blank in an axial direction and an annular recess 29 between the projection 27 and the outer rim portion of the punch allows metal in the blank to extrude axially during the heading operation so as to form an annular, integral collar 30 on the blank.

The die 18 has a frusto-conical recess 32 at the end of the die opening 17 and this frusto-conical recess joins an outer frusto-conical recess or counterbore 33 which is directed at a small acute angle to the outer face of the die and which terminates at its outer edge in a short substantially cylindrical wall 34. It will be understood that when the punch 25 moves against the end of the wire blank, the projecting part of the blank is upset so as to form a head having the two frusto-conical under surfaces and a substantially flat or radial outer face, while at the same time, the upsetting operation forms the annular collar or rim 30 and a central bore in the blank within the collar. In this forming of the head, enough metal is present to fill the counterbore 33 and normally a thin layer of metal may lay outwardly of the face of the die, as indicated by the flash 31. Filling of the counterbore 33 insures that the head, when the flash is removed, will have an outer edge which is uniform in diameter. Also, the cylindrical edge formed by wall 34 allows for trimming and obtaining the desired thinness and rigidity of edge.

The knock-out punch 22 has a central, conically shaped projection 35 and the base of this projection joins a short radial shoulder 36 which in turn joins a slight tapered peripheral wall 37. The latter joins an outer radial wall or shoulder 38 extending to the outer surface of the body of the punch. The punch is held against movement in the opening 17, and the end thereof presses into the end of the blank so that a recess is formed in the end of the blank corresponding in shape to the end of the punch. This operation effects considerable strainhardening or cold working of the metal in the blank at the end of the latter so as to increase the yield point and the strength characteristics of the metal. Around the conical projection 35, the metal is strainhardened or cold worked progressively in an increasing manner from the tip of the projection 35 to the base of the projection. Around the shoulder 37, a rim or end section 40 is formed on the end of the blank which is more uniformly strainhardened with the strainhardening accomplished to a greater extent. The net result of this cold working operation is that the short end section 40 of the blank is strainhardened rather uniformly but to a greater extent while the metal in the blank extending inwardly along the conical projection 35 progressively decreases in yield point and strength resulting from cold working.

After the blank is thus upset in an axial direction to form the head and the strainhardened sections, the punch 25 is withdrawn and then the punch 22 is moved to the left to move the blank out of the die opening. It will be understood that sufficient draft may be provided if necessary on the walls of the punches and projecting portions thereof as well as on the wall 34 of the die to allow removal of the blank without undue difficulty and without damage thereto.

After the blank is removed, it is placed in a holding member or collet indicated at 42 in Figure 4 and rotated and during rotation a cutter 43 is moved radially so as to trim off the flash 31 and the outer face of the head as desired. Ordinarily in this operation the cylindrical edge of the head as formed by the short cylindrical wall 34 of the die opening will be trimmed to smaller dimensions so as to obtain a substantially sharp edge. By having the thicker cylindrical edge initially, an edge having desired rigidity as well as sharpness may be more uniformly obtained through the trimming operation. It may be added that the cutter may also be used to trim the surface of the collar and the dotted line 44 generally indicates the surface of the head and collar after this cutting operation.

Following the cutting operation shown by Figure 4, the headed end of the blank is moved into a position where a plurality of circumferentially spaced rollers 46, 47, and 48 are disposed around the collar 30. These rollers are free to rotate about their own axes and simultaneously are moved radially toward the axis of the rivet blank. This action, in conjunction with rotation of the rivet blank, forces the collar radially inwardly to a position such as indicated in Figure 6 and this reduction of the collar may be accompanied by some actual extrusion of the metal in accordance with reduction in diameter as will be readily understood. After this operation, the collar is trimmed to axial length by means of a cutter 50 which moves radially over the end of the collar as the latter rotates. It might be observed at this point that the operations so far described, permit forming a tapered recess or bore in the end of the blank by a punch pressing operation and thereafter reduction of the collar inwardly to a position wherein its inner diameter is smaller than the large diameter of the tapered recess in the head.

After the structure shown by Figure 6 is obtained, an opening is formed entirely through the member by means of drill 53 as shown in Figure 7. Thereafter the opening is enlarged by means of a drill 54, shown in Figure 8, which enters that end of the element opposite the head on the element. This enlargement of the opening in the structure shown extends to a point adjacent the head and at this point a tapered shoulder 55 is formed by the end of the drill. This shoulder serves as a pin movement limiting means in the setting of the rivet as is explained in the copending application previously mentioned.

Figure 9 shows the completed article ready to receive the male or pin element of the rivet. In this figure, the more uniform and stronger cold worked end section is indicated by cross-hatching at 56 and the progressively cold worked section is indicated by variation in cross-hatching at 57. The main frusto-conical head portion of the element is indicated at 58 and the thinner frusto-conical part or sharp edge fairing is indicated at 59.

The foregoing description principally concerns a so-called flush type rivet having a frusto-conical type of head. Another type of rivet which the invention herein is applicable is the round or brazier type and the manufacture of this structure will now be described.

Figures 11 and 12 show the same wire stock cutting off and blank positioning means as shown in Figures 1 and 2. The same knock-out punch indicated by the numeral 22 is employed for forming the strainhardened or cold worked end of the upsetting operation and for ejecting the blank. A different die element 60 used in upsetting the head has a cylindrical opening 61 extending entirely through the die element.

The heading tool is indicated at 62 in Fig. 13 and has a cavity 63 for forming the rounded rivet head on the blank which is indicated here at 64. This tool has a central opening 66 slidably receiving a punch 67 and a spring 68, abutting a base 69 at one end, presses against an enlarged end 70 on the punch so as to resiliently urge the latter toward the rivet blank. This enlargement moves in an enlarged end 71 of the opening 66 and a stop 73 is provided in the enlarged part of the opening for limiting movement of the punch 67 to the left or in its spring compressing direction. At its right end the punch 67 has a tapered end 74 for forming a tapered recess in the rivet head and a substantially cylindrical smaller part 75 inwardly of the end 74 for defining the inner surface of the integral collar to be formed.

Referring to Figs. 13, 14, 15, and 16, when the element 62 is moved to the right, the projection or end 74 on the punch 67 passes into the projecting end of the blank 64 and upsetting or expansion of the metal occurs. Initially as resistance to movement of the punch 67 increases, the tool 62 moves over it and this form a space between the portion 75 of the punch and the wall of opening 66 into which metal extrudes to form a collar as indicated at 76 in Figure 15. The distance the punch and tool can relatively move is definitely governed by the engagement of the enlarged left end 70 thereof with the abutment 73 and the axial length of the collar formed on the head thus may be governed. Final movement of the parts shown is shown in Figure 16. A thin flange 77 may form at the outer edge of the head and this may be trimmed off, as will be readily understood. Upon completion of the head forming operation as seen in Fig. 16, the tool 62 is retracted and as it moves the spring 68 acts to free the rivet head from the tool by pushing the punch 67 to the right.

The collar 76 may be reduced in diameter by rollers in the manner previously described, and thereafter the element may be drilled through by drilling operations, as before described, so as to form a first bore entirely through the element and then an enlarged part having a tapered shoulder 80. It will be observed that this shoulder is spaced further from the head than the shoulder in the previous structure described and the reason for this is that expansion of the metal in the rivet hole is sometimes desired in this type of rivet. A more detailed disclosure and description of the rivet elements may be found in, and more particularly will be understood from such copending application for patent.

Although more than one form of the invention has been described and illustrated in detail, it will be apparent to those skilled in the art that various modifications may be made without departing from the spirit of the invention.

What is claimed is:

1. The method of manufacturing a rivet element having a head at one end which comprises upsetting a wire or rod blank to form a head at one end, a central axially tapered recess in said head and an integral collar projecting axially from the head around said recess, radially reducing the collar in diameter, and axially drilling entirely through the blank.

2. The method of manufacturing a rivet element having a head at one end which comprises upsetting a wire or rod blank to form a head at one end, a central recess in the head, and an integral collar projecting axially from the head around said recess, radially reducing the collar in diameter, and axially drilling entirely through the blank.

3. The method of manufacturing a rivet element having a head at one end which comprises upsetting a wire or rod blank to form a head at one end, a centrally axially tapered recess in said head and an integral collar projecting axially from the head around said recess, radially reducing the collar in diameter, and axially drilling entirely through the blank with a drill of such size as to remove a part of the tapered recess wall.

4. In the method of manufacturing a rivet element having a head at one end, an opening in the head, and a tubular collar on the outer side of the head and projecting axially therefrom around the opening, the steps of forming the element with the collar, forming the opening, and radially reducing the collar so that its diametrical dimensions are reduced.

5. In the method of manufacturing a rivet element having a head at one end, an opening in the head, and a tubular collar on the outer side of the head and projecting axially therefrom around the opening, the steps of forming the element with the collar, forming the opening and radially reducing the collar so that its inner diameter is less than the diameter of the opening at the outer face of the head.

6. In the manufacture of a rivet element having a head at one end, an opening in the head, and a tubular collar on the outer side of the head and projecting axially therefrom around the opening, the steps of forming the element with the collar, forming the opening by moving a tool into the head through the collar, and radially reducing the collar to reduce its diametrical dimensions.

7. In the manufacture of a rivet element having a head at one end, the steps of upsetting a wire or rod blank to form a head at one end having a tubular collar projecting from the outer end face of such head, forming an axially extending opening in the head, and radially reducing the collar so that its inner and outer diameters are reduced.

8. In the manufacture of a rivet element having a head at one end, the steps of upsetting a wire or rod blank to form a head at one end, a central, axially-extending opening in said head, and an integral collar projecting axially from the head concentrically to said opening, and radially reducing the collar to reduce its diametrical dimensions.

9. In the manufacture of a rivet element having a head at one end, the steps of upsetting a wire or rod blank to form a head at one end, a central, axially extending opening in said head, and an integral collar projecting axially from the head concentrically to said opening and having an internal diameter not less than that of the outer end of the opening, and radially reducing the collar so that its internal diameter is reduced and is less than that of the outer end of the opening in the head.

10. In the manufacture of a rivet element having a head at one end, the steps of upsetting a wire or rod blank to form a head at one end, a central, axially extending opening in said head, and an integral collar projecting axially from the head, radially reducing the collar to reduce its diametrical dimensions, and cutting the collar at its outer end to obtain a predetermined length of collar.

11. In the manufacture of a rivet element, the steps of upsetting one end of a wire or rod blank to form a head having a frusto-conical head portion and an annular skirt or fairing extending radially outwardly from the outer end of such frusto-conical head portion, and surface cutting the outer end face of the head and fairing to obtain a substantially sharp outer edge on the fairing.

12. In the manufacture of a rivet element, the steps of upsetting one end of a wire or rod blank to form a head having a substantially frusto-conical head and an annular collar projecting axially from the outer face of the head, surface cutting the outer end face of the head to obtain a radial end face having a predetermined location axially of the head, and radially reducing the collar to reduce its diametrical dimensions.

13. In the manufacture of a rivet element having a head at one end, the steps of upsetting a wire or rod blank to form a head at one end, a central axially tapered recess in said head and an integral collar projecting axially from the head around said recess, and radially reducing the collar in diameter.

14. In the method of manufacturing a rivet element having a head at one end, the steps of upsetting a wire or rod blank to form a head at one end and a central opening in the head which tapers axially to a larger diameter towards the outer end face of the head, forming an integral collar projecting from the head around the end edge of said recess, and radially reducing the collar in diameter so that its inner diameter is smaller than the outer end of the recess.

15. In the method of manufacturing a rivet element having a head at one end, the steps of upsetting a wire or rod blank to form a head at one end and a central opening in the head which tapers axially to a larger diameter towards the outer end face of the head, forming an integral collar projecting from the head around the end edge of said recess, radially reducing the collar in diameter so that its inner diameter is smaller than the outer end of the recess, and forming an axial bore entirely through the blank.

16. In the method of manufacturing a rivet element, the steps of upsetting one end of a rod or wire blank to form a head having a frusto-conical head portion and an annular skirt or fairing extending radially outwardly from the outer end of such frusto-conical head portion, and confining the outward upsetting of metal so that the peripheral edge of the fairing will have an edge face portion accurately circular and concentric to the axis of the blank.

17. In the method of manufacturing a rivet element, the steps of upsetting one end of a rod or wire blank to form a head having a frusto-conical head portion and an annular skirt or fairing extending radially outwardly from the outer end of such frusto-conical head portion, and confining the outward upsetting of metal so that the peripheral edge of the fairing will have an edge face portion accurately circular and concentric to the axis of the blank, and then surface cutting the end face of the head and fairing to reduce the axial dimensions of the head and such edge face and provide a substantially sharp edge on the fairing.

LOUIS C. HUCK.